US012705137B2

(12) United States Patent
Mongia et al.

(10) Patent No.: US 12,705,137 B2
(45) Date of Patent: Aug. 11, 2026

(54) METHOD AND SYSTEM TO IDENTIFY AND RECOVER FROM FAULTS IN NON-SAFETY TARGETS AND SAFETY TARGETS

(71) Applicant: NXP USA, Inc., Austin, TX (US)

(72) Inventors: Mohit Mongia, Noida (IN); Himanshu Goel, Greater Noida (IN); Amit Kumar, West Sagarpur (IN)

(73) Assignee: NXP USA, Inc., Austin, TX (US)

( * ) Notice: Subject to any disclaimer, the term of this patent is extended or adjusted under 35 U.S.C. 154(b) by 37 days.

(21) Appl. No.: 18/434,195

(22) Filed: Feb. 6, 2024

(65) Prior Publication Data

US 2025/0199914 A1 Jun. 19, 2025

(30) Foreign Application Priority Data

Dec. 14, 2023 (IN) ............................ 202341085558

(51) Int. Cl.
*G06F 11/14* (2026.01)
*G06F 11/07* (2006.01)

(52) U.S. Cl.
CPC ...... *G06F 11/1441* (2013.01); *G06F 11/0757* (2013.01)

(58) Field of Classification Search
CPC ......................... G06F 11/1441; G06F 11/0757
See application file for complete search history.

(56) References Cited

U.S. PATENT DOCUMENTS 9,952,963 B2 4/2018 Mou et al.
10,042,692 B1 8/2018 Azad et al.
11,048,569 B1 6/2021 Seshadri et al.
2010/0235558 A1* 9/2010 Snead ................ G06F 11/0793 710/267
2014/0201578 A1* 7/2014 Kosut ................ G06F 11/0736 714/55
2015/0355989 A1* 12/2015 Hayden ............... G06F 11/3027 714/56
2018/0189156 A1* 7/2018 Hu ............................ G06F 1/28
2019/0370103 A1* 12/2019 Letey ...................... G06F 21/71
2022/0269563 A1 8/2022 Pal Chowdhury et al.
2023/0036117 A1* 2/2023 Krishnani ........... G06F 11/0757
2023/0202493 A1 6/2023 Smolyansky et al.

* cited by examiner

*Primary Examiner* — Ashish Thomas
*Assistant Examiner* — Bryan P Huang

(57) ABSTRACT

A method and system to increase system availability during a fault of a non-safety target is disclosed. A fault signal is received indicative of a response to a request from an initiator not being received from one of a safety target and non-safety target within a response time. Based on the response not being received from the non-safety target, only the non-safety target is reset to increase the system availability rather than also resetting safety targets. Because a target did not respond to the request, a dummy responder further sends to the initiator a response to the request to prevent the initiator from entering into a hang state.

20 Claims, 3 Drawing Sheets

METHOD AND SYSTEM TO IDENTIFY AND RECOVER FROM FAULTS IN NON-SAFETY TARGETS AND SAFETY TARGETS

CROSS-REFERENCE TO RELATED APPLICATIONS

This application claims the priority under 35 U.S.C. § 119 of India patent application Ser. No. 202341085558, filed on 14 Dec. 2023, the contents of which are incorporated by reference herein.

FIELD OF USE

This disclosure generally is directed to safety related systems, and in particular, a method and system to identify and recover from faults in non-safety targets and safety targets.

BACKGROUND

An integrated circuit such as a system-on-a-chip (SoC) includes a plurality of initiators and a plurality of targets which are connected by an interconnect fabric. The initiator is typically a processing core which accesses a target such as a memory controller or a network controller. If the SoC is located in an automobile, the initiator accesses the target to perform an application such as anti-lock braking or an ignition as examples. The anti-lock braking is typically considered a safety application since it increases safety of the automobile while the ignition is typically considered a non-safety application since it does not increase safety of the automobile. The initiator facilitates performing the safety application by accessing a target associated with the safety application in which case the target is a safety target and facilitates performing the non-safety application by accessing a target associated with the non-safety application in which case the target is a non-safety target. The initiator sends a request to access the target to the interconnect fabric which routes the request to the target. The target will send a response to the request to the initiator also via the interconnect fabric. For example, if the target is a memory controller, the request could be a read request and the response could be data which is to be read from a memory. If the initiator does not receive the response by the response time, then the SoC has a fault. The fault is remedied by resetting the SoC which includes resetting the initiators, the safety targets, the non-safety targets, and the interconnect fabric.

Figure 1:
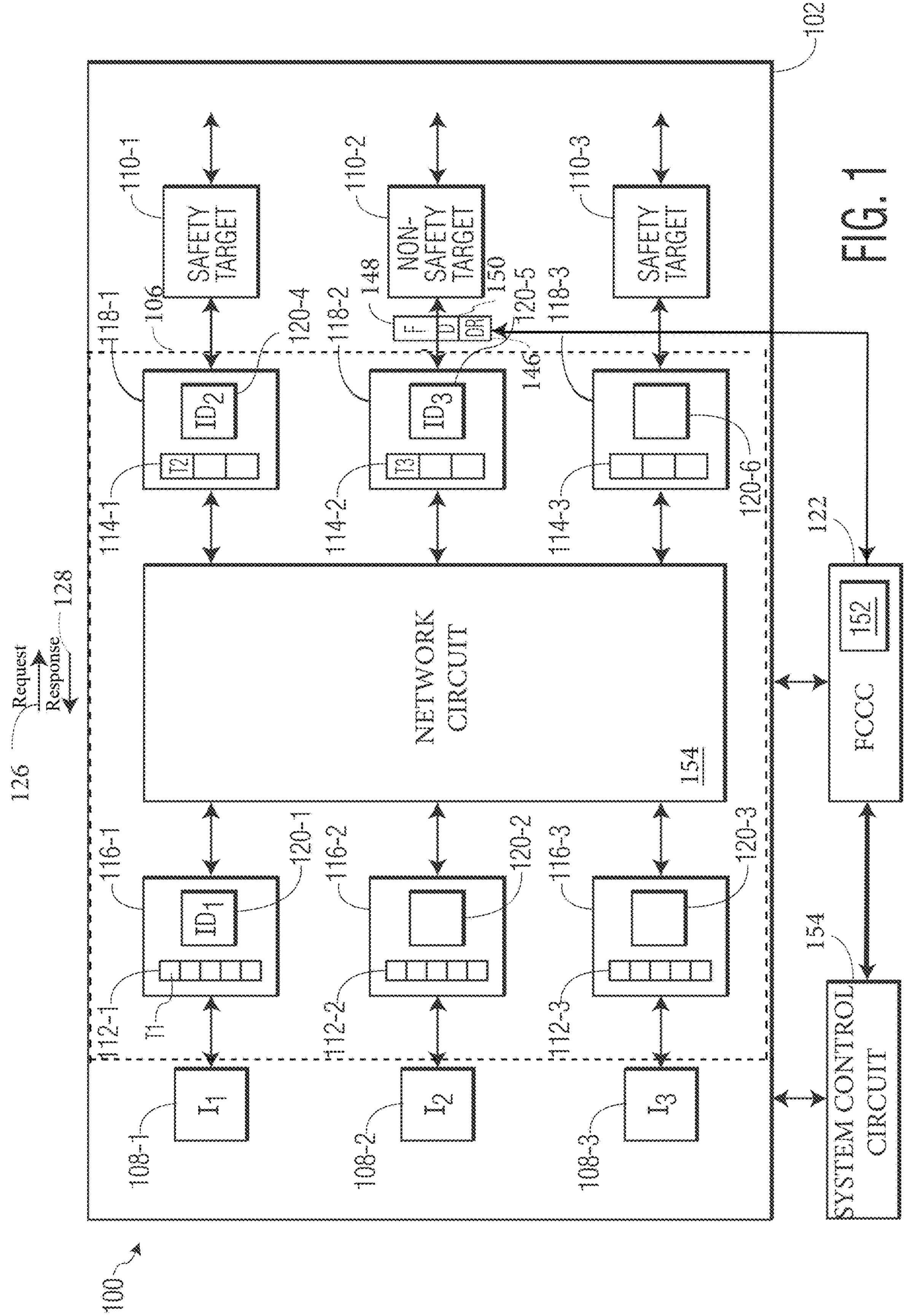
FIG. 1 illustrates an example system for fault identification and recovery in presence of faults in non-safety targets and safety targets in accordance with an embodiment.

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to fault identification and recovery in an integrated circuit such as a system-on-a-chip (SoC) to improve system availability. The system-on-chip (SoC) has an initiator, an interconnect fabric, and a target classified as a safety target or non-safety target. The interconnect fabric further includes a plurality of network interface units (NIUs) coupled to a network circuit. The initiator sends a request to the target. An NIU located between the target and the network circuit receives the request and causes a target timeout logic to start a timer. If the target is a safety target and the NIU does not receive a response to the request from the safety target in a response time, then the safety target has a fault and a fault collection and control circuit (FCCC) causes the SoC to be reset. If the target is a non-safety target and the NIU does not receive a response to the request from the non-safety target, then the FCCC activates fence logic, drain logic, and a dummy responder. The fence logic stops additional requests from the initiator from reaching the non-safety target. Further, the drain logic discards any additional communication from the initiator associated with the request for which the response was not received in the response time. The dummy responder sends a respective response to the request to the initiator and to any additional requests sent by the initiator to the non-safety target so that the initiator does not enter into a hang state. The FCCC also resets the non-safety target. In examples, the non-safety target is reset and the interconnect fabric or other safety targets are not reset when there is a fault in the non-safety target to improve system availability, while the SoC is reset when there is a fault in the safety target. Well known instructions, protocols, structures, and techniques have not been shown in detail in order not to obfuscate the description.

FIG. 1 illustrates an example system 100 for fault identification and recovery in presence of faults in safety targets and non-safety targets in accordance with an embodiment. The system 100 may be embedded in an electronic system (not shown) such as an automotive system or an aircraft guidance system, a ship system, among other types of systems where safety is important to operation. The system 100 may include an integrated circuit such as system-on-a-chip (SoC) 102 having a plurality of initiators 108, an interconnect fabric 106, and a plurality of targets 110. Three initiators 108 and three targets 110 are shown as 108-1, 108-2, 108-3 and 110-1, 110-2, 110-3 respectively but the system 100 may include more or less initiators 108 and more or less targets 110. The initiator 108 and target 110 may be a respective processor core or hardware. For example, the initiator 108 may be a direct memory access (DMA) and the target 110-1 may be a memory controller for double data rate (DDR) memory while target 110-3 may be a bus controller for a Peripheral Communication Interface Express (PCI) bus. The system 100 may have other types of targets in other examples. In an automobile, the system 100 could be part of an ignition, anti-lock braking, or steering as examples. Further, reference to a component such as the initiator 108 or target 110 and any other components disclosed herein having suffix "-i" such as initiator 108-*i* or target 110-*i* where "i" is an integer may refer to a single instance of the component or a plurality of the component depending on the context. To illustrate, initiator 108 may refer to one of the initiators of the plurality of initiators while initiators 108 may refer to a plurality of initiators.

Automotive Safety Integrity Level (ASIL) defines a safety level in an automobile where ASIL A to D represent different degrees of the safety level and quality management (QM) indicates no associated degree of the safety level. An application such as anti-lock braking has a high ASIL associated with providing high degree of safety in the automobile while an application such as the ignition has the QM level associated with providing no degree of safety in the automobile. The target 110 is classified as a safety target if the target 110 is accessed by the initiator 108 as part of operating an application having ASIL A to D while the target 110 is classified as a non-safety target if the target 110 is accessed by the initiator 108 as part of operating an application with a QM level. As an example, target 110-1 may be a safety target and targets 110-2, 110-3 may be non-safety targets. The initiator 108 and the target 110 may be communicatively coupled together via the interconnect fabric 106. The interconnect fabric 106 which is outlined by a dotted line includes a plurality of network interface units (NIUs) 114, 116 coupled to a network circuit 154 to facilitate this communication. In an example, the network circuit 154 may provide an arbitration, routing, or switching of communication between the bus master 102 and bus slave 104 and the NIUs 116, 118 may enable the initiator 108 and target 110 to communicate via the interconnect fabric 106 using an on-chip protocol such as Advanced extensible Interface (AXI). In an example, the system 100 and components thereof described herein may be implemented by one or more of analog circuitry, mix signal circuitry, memory circuitry, logic circuitry, and processing circuitry that executes code that when executed by the processing circuitry performs the disclosed functions, among other implementations.

In an example, the initiator 108 accesses the target 110 by typically sending a message to the target 110 and the target 110 typically sends a message back to the initiator 108. NIU 116 may be coupled between the initiator 108 (i.e., initiator NIUs) and the network circuit 154 while NIU 118 may be coupled between the target 108 and the network circuit 154 (i.e., target NIUs). In an example, one of the messages may be a request 126 and another of the messages may be a response 128 to the request 126 to collectively define a transaction performed between the initiator 108 and target 110 over the interconnect fabric 106. For example, the initiator 108-1 may send the request 126 to an initiator NIU 116-1 of the interconnect fabric 106 which receives the request 126 and sends the request over the network circuit 154 to the target NIU 118-1. In an example, the network circuit 154 may transfer the request 126 from the initiator NIU 116-1 to the target NIU 118-1. In an example, the network circuit 154 may be configured to send the request 126 from the initiator 108-1 to target 110-1 based on a signalling by the initiator 108-1 to the initiator NIU 116-1 and the on-chip bus protocol such as AXI. The target NIU 118-1 then sends the request 126 which is received to the target 110-1. Based on receipt of the request 126, the target 110 will send a response 128 to the request 126 to the initiator 108. For example, the target 110-1 may send the response 128 to the target NIU 118-1 of the interconnect fabric 106 which receives the response 128 and sends the response 128 over the network circuit 154 to the initiator NIU 112-1 and then the initiator 108-1. In an example, the network circuit 154 may be configured to send the response 128 from the target 110-1 to the initiator 108-1 based on a signalling by the target 110-1 to the target NIU 118-1 and the on-chip bus protocol such as AXI. In an example, the request 126 from the initiator 108 could be a read request to read data from a memory and the response 128 may be data which is to be read from the target 110. As another example, the request 126 could be a write request from the initiator 108 and data to be written to the memory and the response 128 may be an acknowledgement from the target 110 that the data is written.

The NIU 116 may have associated initiator timeout logic 112 to determine a fault in the SoC 102. In an example, the NIU 116-1 may receive a request 126 from the initiator 108-1. The NIU 116 may have a buffer 120. Based on the request 126, the NIU 116-1 may store in the buffer 120-1 state information associated with the request 126. For example, the request 126 may indicate a transaction ID which indicates the transaction and which is stored as the state information. The initiator timeout logic 112 may then set a response time when a response 128 should be received from a target 110 and which is predefined for the SoC 102. Based on the response time, the initiator timeout logic 112-1 may instantiate and start a timer T1 which tracks a time between transmission of the request 126 over the network circuit 154 by the NIU 116-1 and when a response 128 to the request 126 is received by the NIU 116-1 from the target 122 over the network circuit 154.

If the NIU 116-1 receives the response 128 to the request 126 before the timer T1 reaches the response time, then the timer T1 is stopped. In an example, the NIU 116-1 may determine that the response 128 corresponds to the request 126 associated with the timer T1 when state information (e.g., transaction ID) of the response 128 corresponds to or matches the state information (e.g., transaction ID) of the request 126 stored in the buffer 120-1. If the NIU 116-1 does not receive the response 128 to the request 126 before the timer T1 reaches the response time, then one or more of the interconnect fabric 106 and the target 110 may be faulty. The initiator timeout logic 112-1 may send a signal to a fault collection and control circuit (FCCC) 122 that the response 128 from a target such as the safety target or non-safety target is not received. The signal may be an interrupt to the FCCC 122 in an example. The FCCC 122 may cause a reset of the SoC 102 when the response 128 to the request 126 is not received by the response time to increase system reliability. The reset may be a hardware reset which clears the software and all configuration parameters from the SoC 102 and boots the SoC 102 to reload the software and configuration parameters. In an example, the SoC reset may be a reset of the target 110, a reset of the interconnect fabric 106, and a reset of the initiator 108. During the reset, both the system targets and non-system targets may be unavailable until the reset is complete.

In an example, the initiator 108 may send a plurality of requests 126 to the NIU 116-1. The NIU 116 may further store respective state information for each request 126 and the initiator timeout logic 112-1 may instantiate a respective timer for each request 126. For example, the NIU 116-1 may store in the buffer 120-1 transaction IDs for the additional requests (not shown) and instantiate corresponding timers in the initiator timeout logic 112 (not shown). The NIU 116-1 may also determine whether respective responses to the plurality of requests is received or signal the FCCC 122 when a response to the request is not received by the NIU 116-1 by the response time.

Embodiments directed herein are directed to fault identification and fault recovery. A faulty target or faulty interconnect fabric 106 cannot be distinguished based on processing of the initiator NIU 116 and the initiator timeout logic 112. To facilitate identifying the fault type, the target NIU 118 may be arranged with target timeout logic 114 and the buffer 120 and the FCCC 122 may perform a reaction tailored to the fault instead of only performing a reset of the SoC 102 when a fault is identified, improving system availability.

In an example, the initiator 108 may send communication in the form of a request 126 to the safety target 110-1. For example, the request 126 may be sent from the initiator 108-1, through the interconnect fabric 106, to the safety target 110-1. During the transmission, the target NIU 118-1 may receive the request 126 and the target timeout logic 114-1 may instantiate and start timer T2. If a response 128 to the request 126 is not received by the target NIU 118-1 from the safety target 110-1 before the timer T2 reaches the response time, then the SoC 102 may send a signal to the FCCC 122 that a response 128 from a safety target is not received which indicates the safety target is faulty. In an example, the signal may be an interrupt to the FCCC 122 to indicate the safety target has a fault. The FCCC 122 may be preconfigured to receive a fault signal from a particular NIU at a particular interface (e.g., slot, pin) of the FCCC 122. The FCCC 122 may be further preconfigured with an indication of whether the NIU associated with a particular interface is coupled to a safety target or non-safety target. During operation, the FCCC 122 may receive a fault signal at the particular interface from the NIU associated with the particular interface. Based on the indication associated with the particular interface, the FCCC 122 may know whether the fault is from a safety target or non-safety target. If the fault is from the safety target, the FCCC 122 may reset the SoC.

In another example, the initiator 108 may send communication in the form of a request 126 to the non-safety target 110-2. For example, the request 126 may be sent from the initiator 108-1 to the non-safety target 110-2 via the interconnect fabric 106. During the transmission, the target NIU 118-2 may receive the request 126. Further, the target timeout logic 114-2 may instantiate and start timer T3. If a response 128 to the request 126 is not received by the target NIU 118-2 from the non-safety target 110-2 before the timer T3 reaches the response time, then the SoC 102 may send a fault signal to the FCCC 122 which indicates the non-safety target is faulty. In an example, the fault signal may be an interrupt to the FCCC 122 and the FCCC 122 may know based on the indication associated with the particular interface from where the fault signal is received that the non-safety target 110-2 has a fault.

The FCCC 122 may not reset the SoC 102 in this example. Instead, the FCCC 122 may activate a dummy responder 146, a fence logic 148, and a drain logic 150 arranged between the non-safety target 110-2 and the target NIU 118-2 based on the signal. A configuration register 152 of the FCCC 122 may include a plurality of bits each of which may be set or cleared. If a bit is set, the dummy responder (DR) 146, fence logic (F) 148, or drain logic (D) 150 corresponding to the bit may be activated and if the bit is cleared, then the dummy responder 146, fence logic 148, or drain logic 150 corresponding to the bit may be deactivated. The signal from the target timeout logic 114-2 may cause one or more bits to be set in the configuration register 152 which activates one or more of the dummy responder 146, fence logic 148, or drain logic 150. In an example, the bit may be a sticky bit which is able to be set by the FCCC 122 and once set read-only until the FCCC 122 clears the sticky bit. The fence logic 148 may stop (i.e., fence) any additional requests from the initiator 108 from reaching the non-safety target 110-2. Further, the drain logic 150 may drain (e.g., discard) any further communication from the initiator 108 associated with the request 126 for which a response was not received by the response time. For example, if the initiator 108 sends data associated with a write request, the drain logic 150 may discard the data which the initiator 108 sends to write following the request 126. The dummy responder 146 may determine based on access to the state information (e.g., transaction ID) in the buffer 120-5 which requests from the initiator 108 are awaiting a response 128 and provide the respective response 128. For example, a request 126 for a memory operation may be a read or write operation and a response 128 provided by the dummy responder 146 may be a read timeout error response or write timeout error response which simulates a response from the non-safety target 110-2. This avoids the initiator 108 having to wait for the response 128 to the request 126 that was sent and causing the system 100 to enter into a hang state. A hang state may be unknown state of the system 100 resulting from the initiator 108 waiting for the response beyond an expected period of time. If the system 100 enters the hang state, then the system operation may be unreliable and could affect a safety of the system 100.

The FCCC 122 may further cause the non-safety target 110-2 to be reset but not any of the safety targets or the interconnect fabric 106. In an example, the reset may be a software reset of the non-safety target 110-2. The software reset may terminate software executing on the non-safety target 110-2 which caused the fault and clear any data in memory associated with the application which caused the fault. In another example, the reset may be a hardware reset of the non-safety target 110-2. The hardware reset may clear the software and all configuration parameters from the non-safety target 110-2 and boot the non-safety target to reload the software and configuration parameters. Other reactions are also possible such as sending an interrupt signal to the non-safety target 110-2 to cause the non-safety target to attempt to rectify the fault without performing a reset. In some examples, the reset may cause a hardware reset when earlier software reset attempts fail and as a result the non-safety target 110-2 may be hardware reset.

In an example, the fence logic 148, drain logic 150, and the dummy responder 146 may be activated while the non-safety target 110-2 is reset. The fence logic 148, drain logic 150, and the dummy responder 146 may process any additional requests received from the initiator 108 until the reset is completed. After the reset is complete, the FCCC 122 may then deactivate the dummy responder 146, the fence logic 146, and the drain logic 150. In an example, the FCCC 122 may deactivate the dummy responder 146, the fence logic 146, and the drain logic 150 by clearing the corresponding bits in the configuration register 152. Advantageously, a fault of the non-safety target 110-5 might not result in the safety target or interconnect fabric 106 being reset, increasing system availability of the safety targets during the fault of the non-safety targets compared to resetting the SoC 102 without identifying a type of the target at fault.

In some examples, the initiator timeout logic 112 and target timeout logic 114 may be used to further identify whether there is a fault in the interconnect fabric 106. If the target timeout logic 114 detects the response 128 to the request 126 before a corresponding timer expires and the initiator timeout logic 112 detects the response 128 to the request 126 before a corresponding timer expires, then the interconnect fabric 106 is not faulty because the response 128 was successfully communicated over the interconnect fabric 106. If the target timeout logic 114 detects the response 128 to the request 126 before a corresponding timer expires but the initiator timeout logic 112 does not detect the response 128 to the request 126 before a corresponding timer expires, then the interconnect fabric 106 is faulty because the response was not successfully communicated over the interconnect fabric 106. The FCCC 122 may receive a fault signal from the target timeout logic 114 indicating the fault but not receive a fault signal from the initiator timeout logic 112 which indicates the interconnect fabric 106 is faulty. In response, the FCCC 122 may reset only the interconnect fabric 106.

Figure 2:
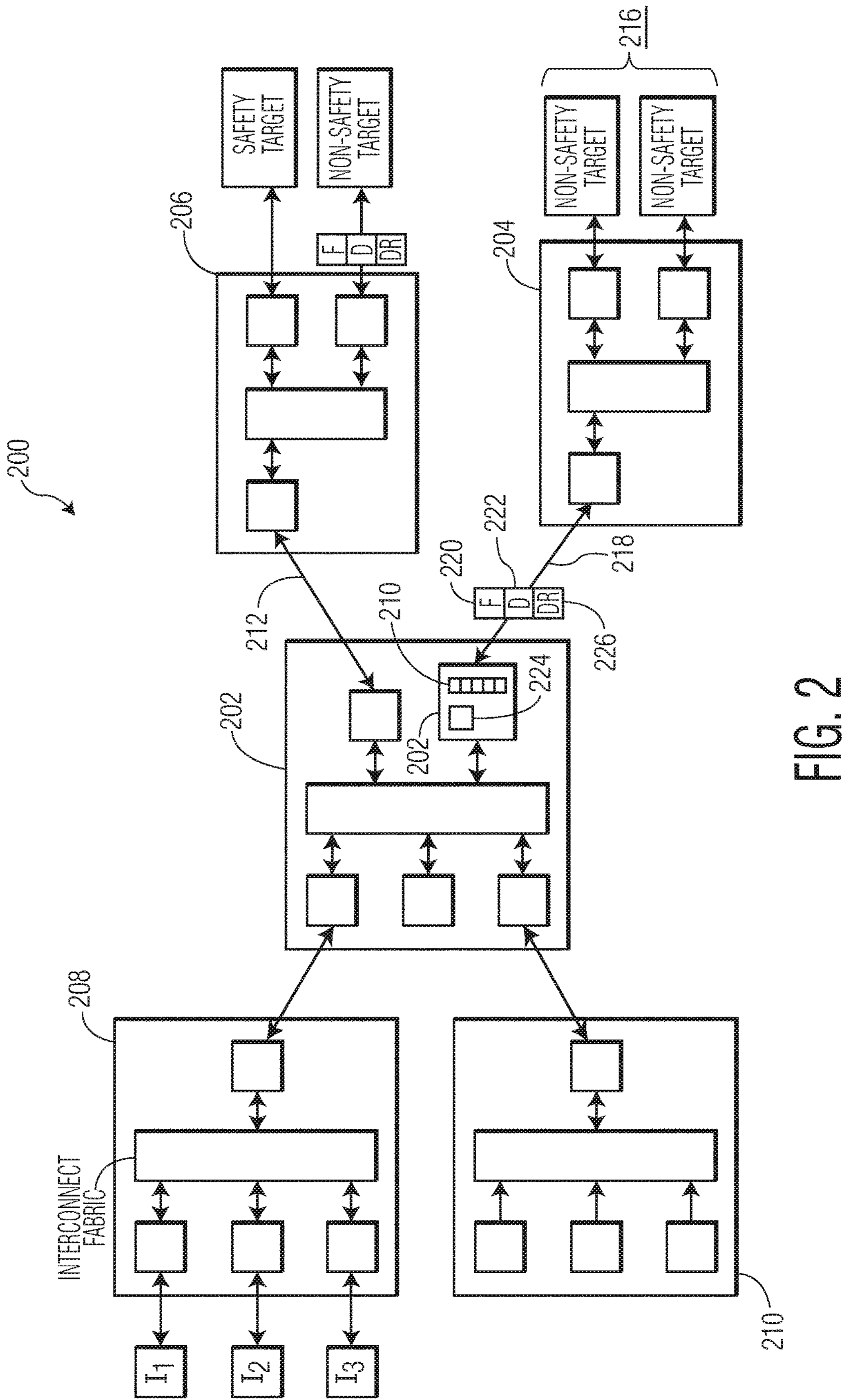
FIG. 2 illustrates another example system for fault identification and recovery in presence of faults in non-safety targets and safety targets in accordance with an embodiment.

FIG. 2 illustrates another example system 200 for fault identification and recovery in presence of faults in safety targets and non-safety targets in accordance with an embodiment. The system 200 may have a plurality of interconnect fabrics 204-210 which are coupled together by respective communication paths, examples of which are communication path 212 which couples interconnect fabric 202 to interconnect fabric 206 and communication path 218 which couples interconnect fabric 202 to interconnect fabric 204. Further, interconnect fabric 204 may be coupled to only non-safety targets 216 and an interconnect fabric 206 may be coupled to a combination of safety targets and non-safety targets. If the interconnect fabric 204 is coupled to non-safety targets 216, then an NIU of the interconnect fabric 204 may not need timeout logic such as 112, 114 or be coupled to fence logic, drain logic, or a dummy responder. Instead, timeout logic 210 may be arranged in NIU 202 of the interconnect fabric 202 preceding the interconnect fabric 204 along with buffer 224. In addition to the timeout logic 210, the interconnect fabric 202 may be coupled to a dummy responder (DR) 226, fence logic (F) 220, and drain logic (D) 222 which operates in a manner described above. Based on a fault being detected by the interconnect fabric 202, FCCC 122 may activate the dummy responder 226, fence logic 220, and drain logic 222 to reset the interconnect fabric 204 coupled the non-safety target 216 and the non-safety targets 216 coupled to the interconnect fabric 204. In the example, the fault may be in the interconnect fabric 204 or non-safety target 216. Advantageously, the interconnect fabric 204 coupled to only non-safety targets has less complexity compared to the interconnect fabric 206 coupled to both safety and non-safety targets. No initiator timeout circuitry and corresponding fence logic, drain logic, dummy responder, or target timeout logic may be needed in the interconnect fabric 204 with only the non-safety targets.

Figure 3:
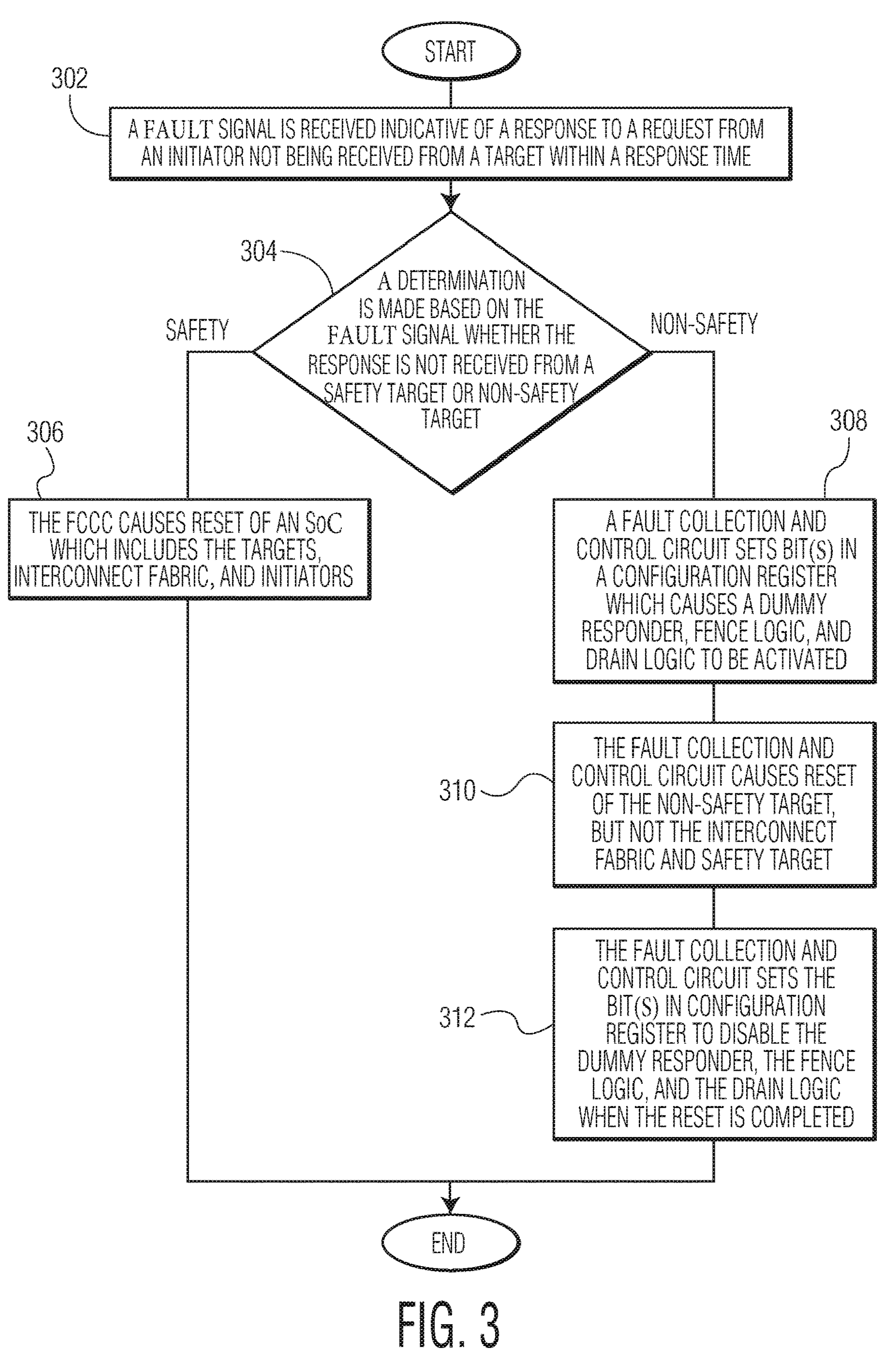
FIG. 3 is a flow chart of functions associated with fault identification and recovery in accordance with an embodiment.

FIG. 3 is a flow chart of functions 300 associated with fault identification and recovery in accordance with an embodiment. The functions may be performed by the FCCC 122 in an example. At 302, a fault signal is received indicative of a response to a request from an initiator not being received from a target within a response time. In an example, the target NIU is arranged between either a safety target or non-safety target which was to send the response and the network circuit 154 to facilitate communication there-between. The FCCC 122 may be preconfigured to know based on the particular target NIU sending the signal whether the response is not received from a safety target or a non-safety target. At 304, a determination is made based on the fault signal whether the response is not received from a safety target or non-safety target. If the response is not received from the safety target, then at 306, the FCCC 122 causes reset of an SoC which includes the targets, interconnect fabric and initiators. For example, the FCCC may signal a fault reaction system to perform the reset of the SoC. If the response is not received from the non-safety target, then at 308, the fault collection and control circuit sets one or more bits in a configuration register which causes a dummy responder, fence logic, and drain logic to be activated. The fence logic may prevent any additional requests received from the initiator from being provided to the non-safety target. The drain logic may drain any further communication from the initiator associated with the request. Further, the dummy responder may send respective responses to the request from the initiator for which the non-safety target did not respond to. At 310, the FCCC causes reset of the non-safety target, but not the interconnect fabric and safety target. For example, the FCCC may signal a fault reaction system to perform the reset of the non-safety target. At 312, the FCCC sets the one or more bits in the configuration register to disable the dummy responder, the fence logic, and the drain logic when the reset is completed. Advantageously, the safety target in the SoC is not reset when a fault is identified to the non-safety target allowing, during the reset, availability of the safe target while a non-safety target is reset due to a fault of the non-safety target.

In an embodiment, a method for reset in an integrated circuit is disclosed. The method comprises: receiving a fault signal; determining based on the fault signal whether a response to a request from an initiator is not received from a safety target or non-safety target within a response time; based on the response not being received from the non-safety target, stopping requests from an initiator from reaching the non-safety target, sending to the initiator a response to the request that the non-safety target has not responded to, and resetting only the non-safety target; and based on the response not being received from the safety target, resetting the safety target and the non-safety target. In an example, the method further comprises setting a respective bit in a configuration register to stop additional communication from the initiator from reaching the non-safety target and sending to the initiator the response to the request sent by the initiator to the non-safety target based on the response not being received from the non-safety target. In an example, the method further comprises clearing the one or more bits in the configuration register after the non-safety target is only reset. In an example, resetting the non-safety target further comprises not resetting the interconnect fabric of the integrated circuit when the non-safety target is reset. In an example, the fault signal is received from a network interface unit (NIU) arranged between a network circuit of an interconnect fabric and one of the non-safety target and safety target. In an example, the request is a read request and the sent response is an error to the read request. In an example, a first NIU is arranged between a network circuit of an interconnect fabric and one of the safety target and non-safety target and a second NIU is arranged between the network circuit and the initiator, the method further comprising determining a fault in the interconnect fabric comprising the NIU and network circuit based on a determination that the response to the request is received by the second NIU and not the first NIU.

In another embodiment, a system on a chip (SoC) is disclosed. The SoC comprises: an initiator; a safety target and a non-safety target; an interconnect fabric arranged to provide communication between the initiator and the target; a network interface unit (NIU) arranged to receive a request from an initiator; determine that a response to the request is not received from one of the safety target and non-safety target in a response time; and send a fault signal to a fault collection and control circuit (FCCC) indicative of the response to the request from the initiator not being received from the safety target or non-safety target within the response time; fence logic arranged between the interconnect fabric and the non-safety target to stop requests from the initiator from reaching the target based on the response not being received from the non-safety target; the dummy responder arranged between the interconnect fabric and the non-safety target to send to the initiator the response to the request that the target has not responded based on the response not being received from the non-safety target; and the fault collection and control circuit (FCCC) arranged to receive the fault signal from the NIU; determine based on the fault signal whether the response is not received from the safety target or the non-safety target; reset only the non-safety target based on the response not being received from the non-safety target; and reset the safety target and the non-safety target based on the response not being received from the safety target. In an example, the FCCC is further arranged to set a respective bit in a configuration register to stop additional communication from the initiator from reaching the non-safety target and to cause the dummy responder to send to the initiator the response to the request. In an example, the FCCC is further arranged to clear the bits in the configuration register after the non-safety target is reset. In an example, the FCCC is further arranged to not reset the interconnect fabric of the integrated circuit when the non-safety target is reset. In an example, the FCCC arranged to reset the safety target and the non-safety target further comprises the FCCC arranged to reset the interconnect fabric and the initiator. In an example, the request is a read request and the response is an error to the read request. In an example, the NIU is arranged between a network circuit of the interconnect fabric and one of the safety target and the non-safety target. In an example, the NIU is first NIU arranged between a network circuit of the interconnect fabric and the target; wherein the SoC further comprises a second NIU arranged between the network circuit and the initiator; and wherein the FCCC is further arranged to determine a fault in the interconnect fabric comprising the NIU and network circuit based on a determination that the response to the request is received by the second NIU and not the first NIU. In an example, the SoC further comprises drain logic arranged between the interconnect fabric and the non-safety target to discard additional data sent by the initiator and associated with the request based on only the non-safety target being reset.

In yet another embodiment, a system on a chip (SoC) is disclosed. The SoC comprises: a plurality of initiators; a plurality of targets; a plurality of interconnect fabrics arranged to facilitate communication between at least one initiator and at least one target; wherein a plurality of first non-safety and first safety targets is coupled to a first interconnect fabric; second non-safety targets are only coupled to a second interconnect fabric; and a third interconnect fabric is coupled to the first interconnect fabric and the second interconnect fabric by a respective communication path; the third interconnect fabric further comprising a network interface unit (NIU) arranged to receive a communication from an initiator; fence logic arranged between the third interconnect fabric and the second interconnect fabric to stop the communication from the initiator from reaching the second interconnect fabric over the communication path between the second interconnect fabric and third interconnect fabric when a fault is detected in at least one of the second non-safety targets; and a dummy responder arranged between the third interconnect fabric and the second interconnect fabric to respond to the communication from the initiator when the fault is detected in at least one of the second non-safety targets. In an example, fence logic and a dummy responder are arranged between the first non-safety target and the first interconnect fabric. In an example, no fence logic and no dummy responder are arranged between the second non-safety targets and the second interconnect fabric. In an example, no fence logic and no dummy responder are arranged between the first interconnect fabric and the third interconnect fabric.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method for reset in an integrated circuit, the method comprising:

receiving a fault signal indicative of a response to a request from an initiator not being received within a response time;

determining based on the fault signal a type of target from which the response is not received;

based on a determination at a first network interface unit (NIU) coupled to a network circuit that the response is not received from a non-safety target within the response time, stopping requests from an initiator from reaching the non-safety target, sending, by a dummy responder, to the initiator a response to the request that the non-safety target has not responded to, and resetting only the non-safety target; and based on a determination at a second network interface unit coupled to the network circuit that the response is not received from a safety target within the response time, resetting the safety target and the non-safety target;

wherein the non-safety target is coupled to the first network interface unit, the safety target is coupled to the second network interface unit, the first network interface unit and the second network interface unit are coupled to the same network circuit, the non-safety target and the safety target communicate with the same network circuit over separate communication paths, and the dummy responder is arranged on a communication path between the first network interface unit and the non-safety target.

2. The method of claim 1, further comprising setting a respective bit in a configuration register to stop additional communication from the initiator from reaching the non-safety target and sending to the initiator the response to the request sent by the initiator to the non-safety target based on the response not being received from the non-safety target.

3. The method of claim 2, further comprising clearing the one or more bits set in the configuration register after the non-safety target is only reset.

4. The method of claim 1, wherein resetting the non-safety target further comprises not resetting an interconnect fabric of the integrated circuit when the non-safety target is reset.

5. The method of claim 1, wherein the fault signal is received from one of the NIUs arranged between a network circuit of an interconnect fabric and one of the non-safety target and safety target.

6. The method of claim 1, wherein the request is a read request and the response sent to the initiator is an error to the read request.

7. The method of claim 1, wherein a third NIU is arranged between the network circuit and the initiator, the method further comprising determining a fault in an interconnect fabric comprising the first NIU, the second NIU, the third NIU, and the network circuit based on a determination that the response to the request is received by one of the first NIU and second NIU and not the third NIU.

8. A system on a chip (SoC) comprising:

an initiator;

a safety target and a non-safety target;

an interconnect fabric arranged to provide communication between the initiator and the safety target and the non-safety target;

a first network interface unit (NIU) coupled to a network circuit and arranged to receive a first request from an initiator; determine that a response to the first request is not received in a response time from the safety target; and send a fault signal to a fault collection and control circuit (FCCC) indicative of the response to the first request from the initiator not being received within the response time;

a second network interface unit (NIU) coupled to the network circuit and arranged to receive a second request from an initiator; determine that a response to the second request is not received in a response time from the non-safety target; and send a fault signal to the fault collection and control circuit (FCCC) indicative of the response to the second request from the initiator not being received within the response time;

fence logic arranged between the interconnect fabric and the non-safety target to stop requests from the initiator from reaching the non-safety target based on the response not being received from the non-safety target;

a dummy responder arranged to send to the initiator a response to the request that the non-safety target has not responded to, based on the response not being received from the non-safety target; and the fault collection and control circuit (FCCC) arranged to receive the fault signal from the first NIU or the second NIU; determine based on the fault signal a type of target from which the response is not received; reset only the non-safety target based on the response not being received from the non-safety target; and reset the safety target and the non-safety target based on the response not being received from the safety target, wherein the non-safety target is coupled to the second network interface unit, the safety target is coupled to the first network interface unit, the first network interface unit and the second network interface unit are coupled to the same network circuit of the interconnect fabric, the non-safety target and the safety target communicate with the same network circuit over separate communication paths, and the dummy responder is arranged on a communication path between the second network interface unit and the non-safety target.

9. The SoC of claim 8, wherein the FCCC is further arranged to set a respective bit in a configuration register to stop additional communication from the initiator from reaching the non-safety target and to cause the dummy responder to send to the initiator the response to the request.

10. The SoC of claim 8, wherein the FCCC is further arranged to clear the bits set in the configuration register after the non-safety target is reset.

11. The SoC of claim 10, wherein the FCCC is further arranged to not reset the interconnect fabric when the non-safety target is reset.

12. The SoC of claim 11, wherein the FCCC arranged to reset the safety target and the non-safety target further comprises the FCCC being further arranged to reset the interconnect fabric and the initiator.

13. The SoC of claim 8, wherein the request is a read request and the response is an error to the read request.

14. The SoC of claim 8, wherein the NIU is arranged between a network circuit of the interconnect fabric and one of the safety target and the non-safety target.

15. The SoC of claim 8, wherein the SoC further comprises a third NIU arranged between the network circuit and the initiator; and wherein the FCCC is further arranged to determine a fault in the interconnect fabric based on a determination that the response to the request is received by the first NIU or the second NIU and not the third NIU.

16. The SoC of claim 8, further comprising drain logic arranged between the interconnect fabric and the non-safety target to discard additional data sent by the initiator and associated with the request based on only the non-safety target being reset.

17. A system on a chip (SoC) comprising:

a plurality of initiators;

a plurality of targets;

a plurality of interconnect fabrics arranged to facilitate communication between at least one initiator and at least one target; wherein a plurality of first non-safety and first safety targets is coupled to a first interconnect fabric; second non-safety targets are only coupled to a second interconnect fabric; and a third interconnect fabric is coupled to the first interconnect fabric and the second interconnect fabric by a respective communication path;

the third interconnect fabric further comprising a network interface unit (NIU) arranged to receive a communication from an initiator and provide a fault signal indicative of a fault detected to a fault collection and control circuit (FCCC) when a response to a request from the initiator is not received within a response time from one of the second non-safety targets;

fence logic arranged between the third interconnect fabric and the second interconnect fabric to stop the communication from the initiator from reaching the second interconnect fabric over the communication path between the second interconnect fabric and third interconnect fabric when the fault is detected; and a dummy responder arranged between the third interconnect fabric and the second interconnect fabric to respond to the communication from the initiator when the one of the second non-safety targets does not respond and the fault is detected;

wherein the FCCC is arranged to determine based on the fault signal a type of target from which the response is not received and reset only one or more of the second non-safety targets based on the response not being received from the one of the second non-safety targets, wherein the FCCC is further arranged to reset the first safety targets, the first non-safety targets, and the second non-safety targets based on another fault signal indicating that a response is not received from one of the first safety targets;

wherein a first non-safety target of the plurality of first non-safety targets is coupled to a first network interface unit of the first interconnect fabric, a first safety target of the plurality of first safety targets is coupled to a second network interface unit of the first interconnect fabric, the first network interface unit of the first interconnect fabric and the second network interface unit of the first interconnect fabric is coupled to a same network circuit of the first interconnect fabric, and another dummy responder is arranged on a communication path between the first network interface unit of the first interconnect fabric and the first non-safety target coupled to the first network interface of the first interconnect fabric.

18. The SoC of claim 17, wherein fence logic and a dummy responder are arranged between the first non-safety targets and the first interconnect fabric.

19. The SoC of claim 18, wherein no fence logic and no dummy responder are arranged between the second non-safety targets and the second interconnect fabric.

20. The SoC of claim 19, wherein no fence logic and no dummy responder are arranged between the first interconnect fabric and the third interconnect fabric.

* * * * *